US012719268B2

(12) United States Patent
Mrkovic et al.

(10) Patent No.: US 12,719,268 B2
(45) Date of Patent: Aug. 25, 2026

(54) CONTACTLESS DETECTION AND RECOGNITION OF CRITICAL DEVICE SUBSYSTEMS

(71) Applicant: VERTIV CORPORATION, Westerville, OH (US)

(72) Inventors: Bosko Mrkovic, Konjscina (HR); Douglas Keith Maly, Stubicke Toplice (HR)

(73) Assignee: Vertiv Corporation, Westerville, OH (US)

( * ) Notice: Subject to any disclaimer, the term of this patent is extended or adjusted under 35 U.S.C. 154(b) by 9 days.

(21) Appl. No.: 18/886,530

(22) Filed: Sep. 16, 2024

(65) Prior Publication Data

US 2025/0112459 A1 Apr. 3, 2025

Related U.S. Application Data

(60) Provisional application No. 63/541,655, filed on Sep. 29, 2023.

(51) Int. Cl.
*H02J 9/06* (2006.01)
*G01C 1/00* (2006.01)
*H02J 1/08* (2026.01)

(52) U.S. Cl.
CPC .................. *H02J 1/08* (2013.01); *H02J 9/06* (2013.01); *G01C 1/00* (2013.01)

(58) Field of Classification Search
CPC .................. H02J 1/08; H02J 9/06; G01C 1/00
USPC ............................................................ 307/24
See application file for complete search history.

(56) References Cited

U.S. PATENT DOCUMENTS

2017/0202595 A1 7/2017 Shelton, IV
2019/0064898 A1* 2/2019 Nommensen ........ H05K 7/1457
2023/0324701 A1* 10/2023 Kasar ................ G02B 27/0006 345/8
2023/0412007 A1* 12/2023 Melone .................. H02J 50/10

FOREIGN PATENT DOCUMENTS

WO 2021077391 A1 4/2021

OTHER PUBLICATIONS

European Patent Office, Extended European Search Report received in EP Application No. 24202182.2, Mar. 11, 2025, 9 pages.

* cited by examiner

*Primary Examiner* — Michael R. Fin
(74) *Attorney, Agent, or Firm* — Suiter Swantz IP

(57) ABSTRACT

A power management device (PMD) may include one or more electrical components including at least one of a battery, a rectifier, an alternating current (AC) to direct current (DC) converter, or a DC to AC converter, where the one or more electrical components are configured to receive input power and provide output power to one or more loads. The PMD may also include a non-contact sensor suitable for distinguishing between a plurality of configurations of a keyed feature. The PMD may identify an accessory including a particular configuration of the keyed feature based on data from the non-contact sensor when the accessory is coupled with the power management device and adjust one or more configuration parameters of the power management device based on the identified accessory.

18 Claims, 13 Drawing Sheets

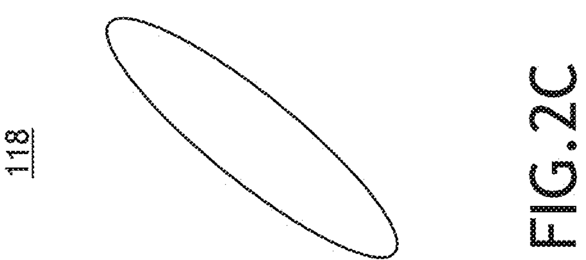
FIG.2C
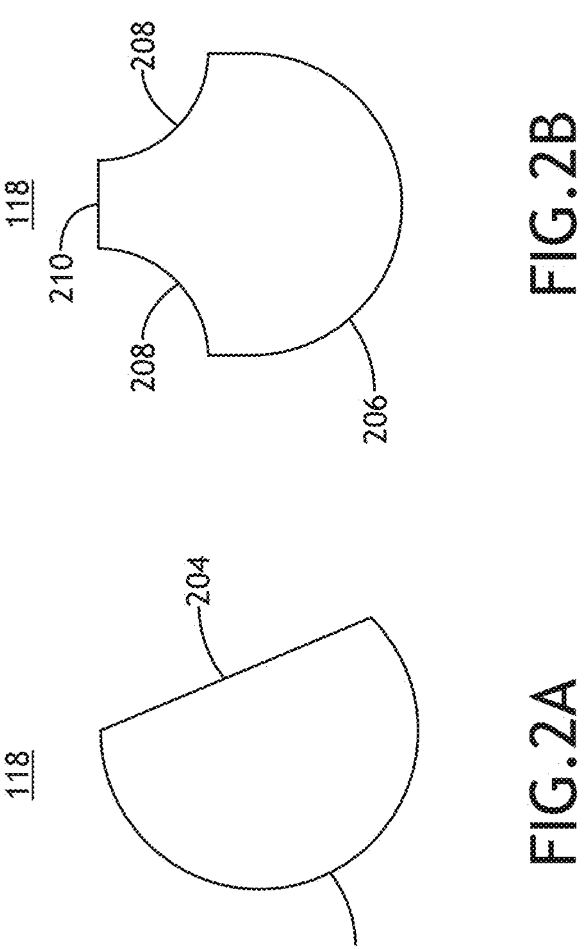
FIG.2B
FIG.2A

CONTACTLESS DETECTION AND RECOGNITION OF CRITICAL DEVICE SUBSYSTEMS

CROSS-REFERENCE TO RELATED APPLICATION

The present application claims the benefit under 35 U.S.C. § 119(e) of U.S. Provisional Application Ser. No. 63/541,655, filed Sep. 29, 2023, entitled CONTACTLESS DETECTION AND RECOGNITION OF CRITICAL DEVICE SUBSYSTEMS, naming Bosko Mrkovic and Douglas Keith Maly as inventors, which is incorporated herein by reference in the entirety.

TECHNICAL FIELD

The present disclosure relates generally to power management systems and, more particularly, to interconnections between components of power management systems.

BACKGROUND

An uninterruptible power supply (UPS) or other power management systems may accept interchangeable parts such as, but not limited to, power output distribution (POD) units. Typical techniques for detection and configuration of such interchangeable parts utilize internal circuitry based on hardwired connections. However, such approaches may introduce complexity and cost. There is therefore a need to develop systems and methods to address these deficiencies.

SUMMARY

In embodiments, the techniques described herein relate to a power management device including a power management device including one or more electrical components including at least one of a battery, a rectifier, an alternating current (AC) to direct current (DC) converter, or a DC to AC converter, where the one or more electrical components are configured to receive input power and provide output power to one or more loads; a non-contact sensor suitable for distinguishing between a plurality of configurations of a keyed feature; and a controller configured to identify an accessory including a particular configuration of the keyed feature based on data from the non-contact sensor when the accessory is coupled with the power management device; and adjust one or more configuration parameters of the power management device based on the identified accessory.

In embodiments, the techniques described herein relate to a power management device, where the plurality of configurations of the keyed feature include a plurality of angles of a component of the keyed feature.

In embodiments, the techniques described herein relate to a power management device, where the non-contact sensor includes an angle sensor.

In embodiments, the techniques described herein relate to a power management device, where the keyed feature includes a protruding feature extending from a casing of the accessory, where the plurality of angles of the component of the keyed feature correspond to angles of a face of the protruding feature.

In embodiments, the techniques described herein relate to a power management device, where the keyed feature includes a slit in a casing of the accessory, where the plurality of angles of the component of the keyed feature correspond to angles of the slit.

In embodiments, the techniques described herein relate to a power management device, where adjust the one or more configuration parameters of the power management device based on the identified accessory includes adjust at least one of a power, a voltage, or a current of the output power provided to at least one of the one or more loads.

In embodiments, the techniques described herein relate to a power management device, where the power management device includes an uninterruptible power supply (UPS).

In embodiments, the techniques described herein relate to a power management device, where the power management device includes a power distribution unit (PDU).

In embodiments, the techniques described herein relate to a power management device, where the power management device includes a DC power system.

In embodiments, the techniques described herein relate to a power management device, where the accessory includes an input/output (I/O) component.

In embodiments, the techniques described herein relate to a power management device, where the accessory includes a PDU.

In embodiments, the techniques described herein relate to a power management device, where the accessory includes a power output distribution unit (POD).

In embodiments, the techniques described herein relate to a method including identifying, with a non-contact sensor of a power management device, an accessory based on a particular configuration of a keyed feature when the accessory is coupled with the power management device, where the power management device includes one or more electrical components including at least one of a battery, a rectifier, an alternating AC to DC converter, or a DC to AC converter, where the one or more electrical components are configured to receive input power and provide output power to one or more loads; and adjusting one or more configuration parameters of the power management device based on the identified accessory.

In embodiments, the techniques described herein relate to a method, where identifying, with the non-contact sensor of the power management device, the accessory based on the particular configuration of the keyed feature when the accessory is coupled with the power management device includes identifying a particular angle of a component of the keyed feature from a plurality of possible angular orientations of the component.

In embodiments, the techniques described herein relate to a method, where the keyed feature includes a protruding feature extending from a casing of the accessory, where the plurality of possible angular orientations of the component of the keyed feature correspond to angles of a face of the protruding feature.

In embodiments, the techniques described herein relate to a method, where the keyed feature includes a slit in a casing of the accessory, where the plurality of possible angular orientations of the component of the keyed feature correspond to angles of the slit.

In embodiments, the techniques described herein relate to a method, where adjusting the one or more configuration parameters of the power management device based on the identified accessory includes adjust at least one of a power, a voltage, or a current of the output power provided to the one or more loads connected to the power management device.

In embodiments, the techniques described herein relate to a method, where the power management device includes at least one of an uninterruptible power supply (UPS), a PDU, or a DC power system.

In embodiments, the techniques described herein relate to a method, where the accessory includes at least one of an I/O component, a PDU, or a POD.

In embodiments, the techniques described herein relate to a power management system including an accessory including a particular configuration of a keyed feature; and a power management device including one or more electrical components including at least one of a battery, a rectifier, an AC to DC converter, or a DC to AC converter, where the one or more electrical components are configured to receive input power and provide output power to one or more loads; a non-contact sensor suitable for distinguishing between a plurality of configurations of the keyed feature; and a controller configured to identify the accessory based on data from the non-contact sensor when the accessory is coupled with the power management device; and adjust one or more configuration parameters of the power management device based on the identified accessory.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIG. 2A is a cross-sectional view of a first non-limiting example of a keyed feature, in accordance with one or more embodiments of the present disclosure.

FIG. 2B is a cross-sectional view of a second non-limiting example of a keyed feature, in accordance with one or more embodiments of the present disclosure.

FIG. 2C is a cross-sectional view of a third non-limiting example of a keyed feature, in accordance with one or more embodiments of the present disclosure.

DETAILED DESCRIPTION

Figure 1:
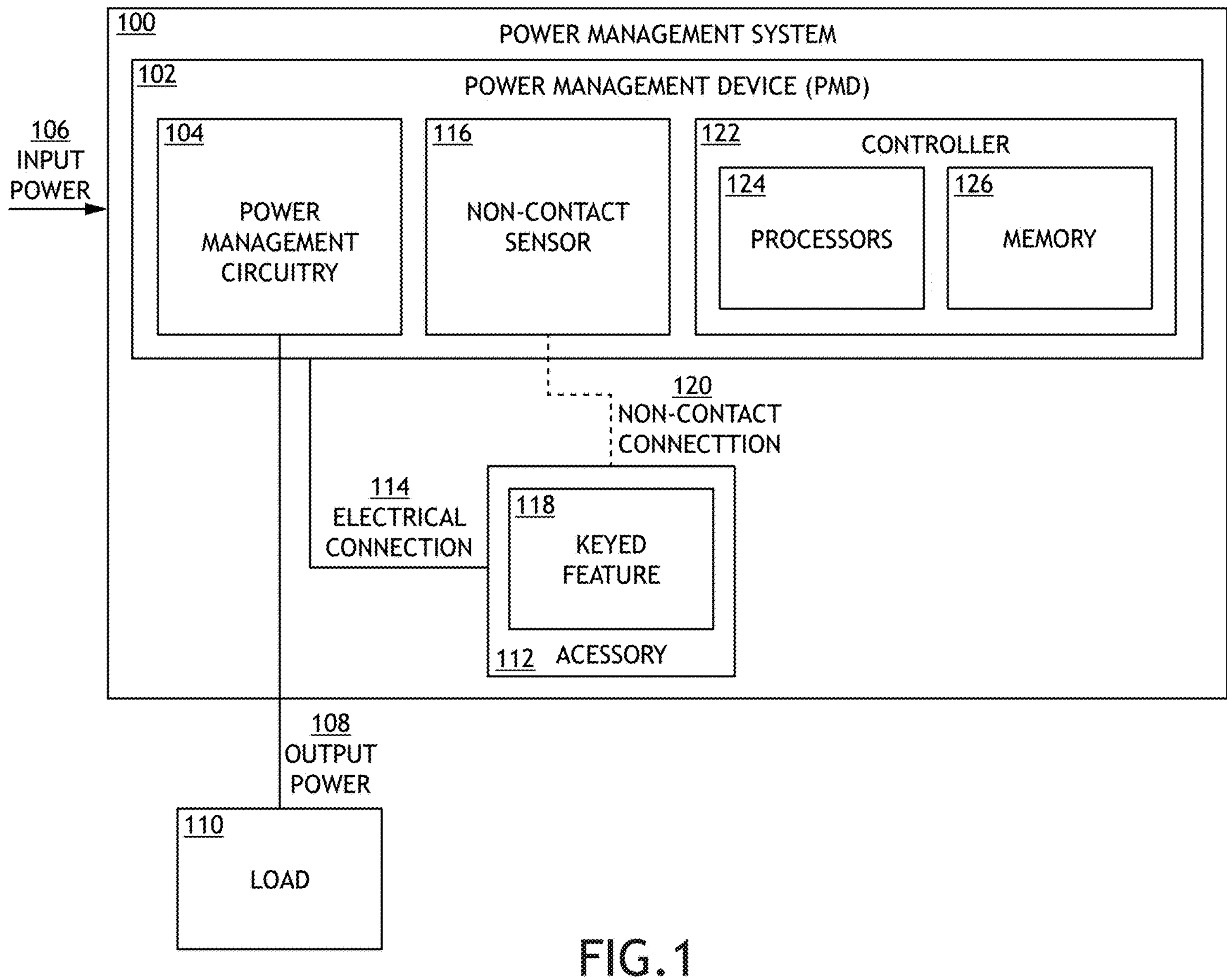
FIG. 1 is a block diagram of a power management system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods providing non-contact identification of removable components of a power management system.

A power management system may include a power management device (PMD) such as, but not limited to, an uninterruptible power supply (UPS), a direct current (DC) power system, or a power distribution unit (PDU) and may further include one or more removable accessories. For example, the PMD may include electrical components suitable for receiving input power (e.g., alternating current (AC) or DC power) and distributing power to one or more loads. The accessories may include various components to facilitate or configure the operation of the PMD such as, but not limited to, input and/or output connectors or circuit breakers. As an illustration, an accessory may include, but is not limited to, a power output distribution (POD) unit. In this way, the PMD may be configurable for operation with any of multiple accessories with different functionality and/or power capabilities. Put another way, the PMD may be configured for a specific application through selection and installation of an appropriate accessory.

It is contemplated herein that non-contact identification of an accessory coupled to a PMD may provide numerous benefits. For example, non-contact identification techniques as disclosed herein may avoid interference associated with high-power signals transmitted by or otherwise managed by the PMD and/or any accessories. In contrast, identification of an accessory through control signals established through direct electrical connections (e.g., wiring) between the PMD and the accessory may be impaired by such interference. As another example, non-contact identification techniques as disclosed herein may provide a relatively simple and safe solution. As another example, non-contact identification techniques as disclosed herein may require fewer parts and thus be relatively cost-effective.

In some embodiments, non-contact identification of an accessory is achieved through the use of a keyed feature on the accessory and a non-contact sensor on the PMD suitable for distinguishing between different configurations of the keyed feature. For example, the PMD may include a non-contact angle sensor such as, but not limited to, a magnetoresistive angle sensor. In this configuration, an accessory may include a keyed feature with an asymmetric profile that may locally disturb a magnetic field in a manner that may be characterized by the magnetoresistive angle sensor for the purposes of identification. For instance, different accessories may have different configurations of the keyed feature such that the PMD may identify a proximate accessory based on an angle measurement (e.g., an orientation measurement more generally) of the associated keyed feature.

Once the PMD has identified a coupled accessory, the PMD may use this information for any suitable purpose. For example, the PMD may adjust configuration parameters such as, but not limited to, a power output, a voltage, a current, or an operational frequency based on the identified accessory. In this way, non-contact identification of the accessory may provide load control during operation and/or safety control.

Referring now to FIGS. 1-7, systems and methods providing non-contact identification of components in a power management system are described in greater detail, in accordance with one or more embodiments of the present disclosure.

FIG. 1 is a block diagram of a power management system 100, in accordance with one or more embodiments of the present disclosure.

In some embodiments, the power management system 100 includes a PMD 102 including power management circuitry 104 suitable for receiving input power 106 from an external source and distributing output power 108 to one or more loads 110. The power management circuitry 104 may include any type of passive or active electrical components including, but not limited to, one or more batteries, one or more rectifiers, one or more amplifiers, one or more AC to DC converters, one or more DC to AC converters, one or more DC to DC converters, one or more transformers, one or more transistors, one or more resistors, one or more capacitors, or one or more inductors. Further, the input power 106 and/or the output power 108 may be any combination of AC or DC power. In this way, the PMD 102 may thus operate as any type of power management device such as, but not limited to, a UPS, a DC power system, or a PDU. Further, in the case of AC operation, the PMD 102 may be compatible with 1-phase and/or 3-phase power.

In some embodiments, the PMD 102 is suitable for coupling with at least one accessory 112. For example, an accessory 112 may include input/output (I/O) components such as, but not limited to, wires, terminals, plugs, or the like. As another example, an accessory 112 may include electrical circuitry to control and/or complement the operation of the PMD 102. In some embodiments, an accessory 112 includes a power-output distribution (POD) unit, which may include a circuit breaker and various I/O components.

A PMD 102 may be configured to operate with any number of accessories 112 to provide configurable operation suitable for different applications. For example, a PMD 102 may be configured to operate with a variety of POD accessories 112 having different power capacities and/or connection types. In this way, a user may tailor the operation of the PMD 102 through selection and installation of a suitable POD accessory 112.

In some embodiments, a PMD 102 is electrically connected with an accessory 112 via one or more electrical connections 114. Continuing the example in which an accessory 112 includes I/O components, input power 106 and/or output power 108 may flow through the electrical connections 114. In this way, the electrical connections 114 between the PMD 102 and the accessory 112 may be selected based on the power requirements of the power management system 100.

In some embodiments, the PMD 102 includes a non-contact sensor 116 suitable for identifying a coupled or proximate accessory 112 based on measurements of a keyed feature 118 on the accessory 112 (e.g., associated with a non-contact pathway 120).

Any type of non-contact sensor 116 suitable for distinguishing between any type of characteristic or property of a keyed feature 118 is within the spirit and scope of the present disclosure.

In some embodiments, the non-contact sensor 116 is an angle sensor suitable for measuring an angle of a component of the keyed feature. Different accessories 112 may then have keyed features 118 with different possible angular orientations such that the different accessories 112 may be distinguished based on the measured angular orientations of the associated keyed features 118.

For example, the keyed feature 118 may include a protruding feature that extends from a casing of an accessory 112, where the protruding feature includes one or more angled and/or curved faces to provide an asymmetrical profile. In this configuration, the non-contact sensor 116 may determine an orientation angle of the one or more angled faces or of the asymmetrical profile more generally.

As another example, the keyed feature 118 may include an opening in a casing of an accessory 112. In this configuration, the non-contact sensor 116 may determine an orientation angle of the opening.

FIGS. 2A-2C depict three non-limiting implementations of asymmetric cross-sectional profiles of a keyed feature 118, in accordance with one or more embodiments of the present disclosure. Each of the asymmetric cross-sectional profiles in FIGS. 2A-4C may be implemented as a protruding feature extending from a casing of an accessory 112 and/or as an opening from a casing of an accessory 112.

FIG. 2A is a cross-sectional view of a first non-limiting example of a keyed feature 118, in accordance with one or more embodiments of the present disclosure. In FIG. 2A, the keyed feature 118 has an asymmetric profile characterized as a truncated circle. For example, the keyed feature 118 in FIG. 2A has a curved outer edge 202 and a planar edge 204 (e.g., a planar face). FIG. 2B is a cross-sectional view of a second non-limiting example of a keyed feature 118, in accordance with one or more embodiments of the present disclosure. In FIG. 2B, the keyed feature 118 includes a curved outer edge 206, two concave edges 208, and a planar edge 210. FIG. 2C is a cross-sectional view of a third non-limiting example of a keyed feature 118, in accordance with one or more embodiments of the present disclosure. In FIG. 2C, the keyed feature 118 includes an elliptical profile.

Figure 2D:
FIG. 2D is a three-dimensional view of a stamped and formed casing of an accessory including a protruding keyed feature, in accordance with one or more embodiments of the present disclosure.
Figure 2D:
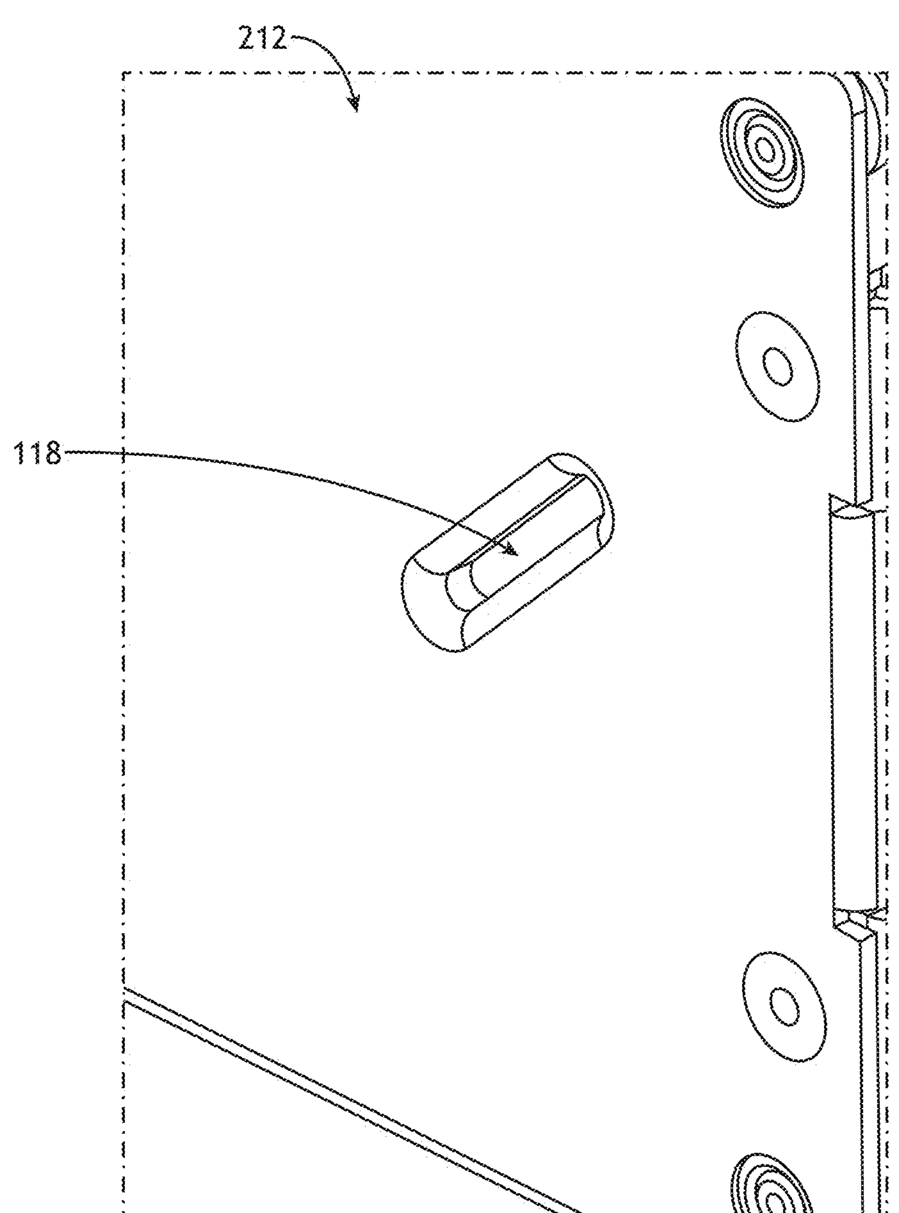
Figure 2E:
FIG. 2E is a three-dimensional view of a punched casing of an accessory including a protruding keyed feature, in accordance with one or more embodiments of the present disclosure.
Figure 2E:
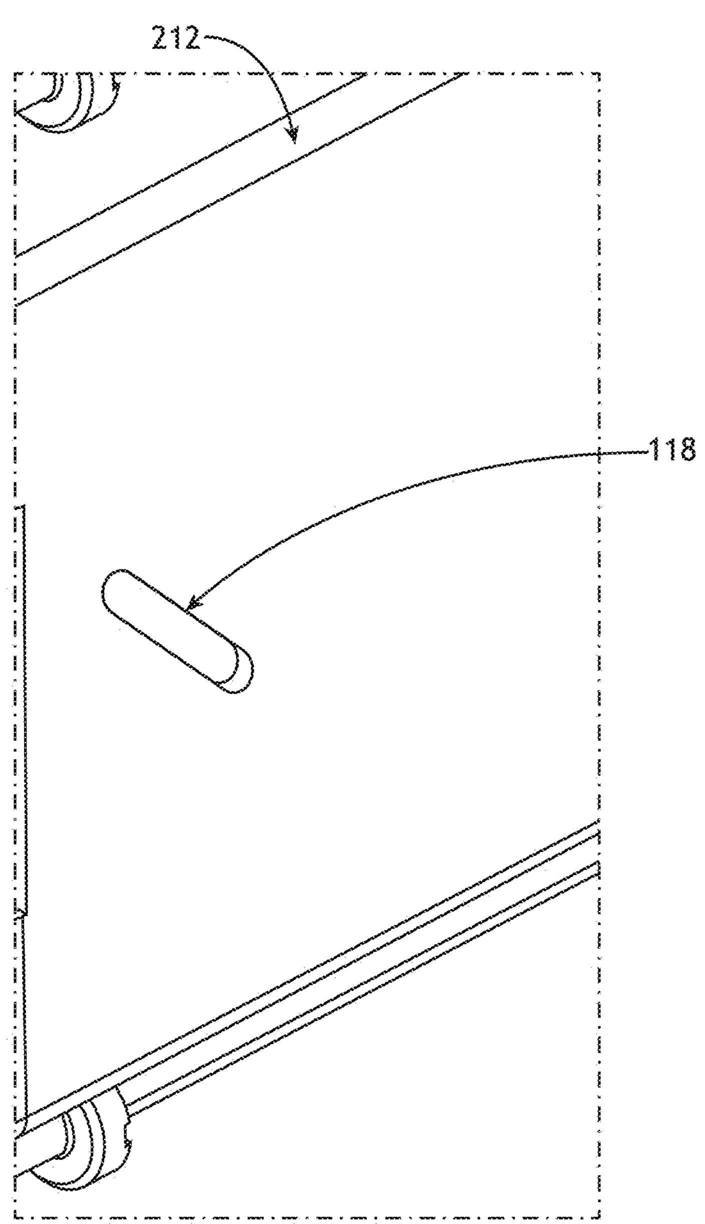
Figure 2F:
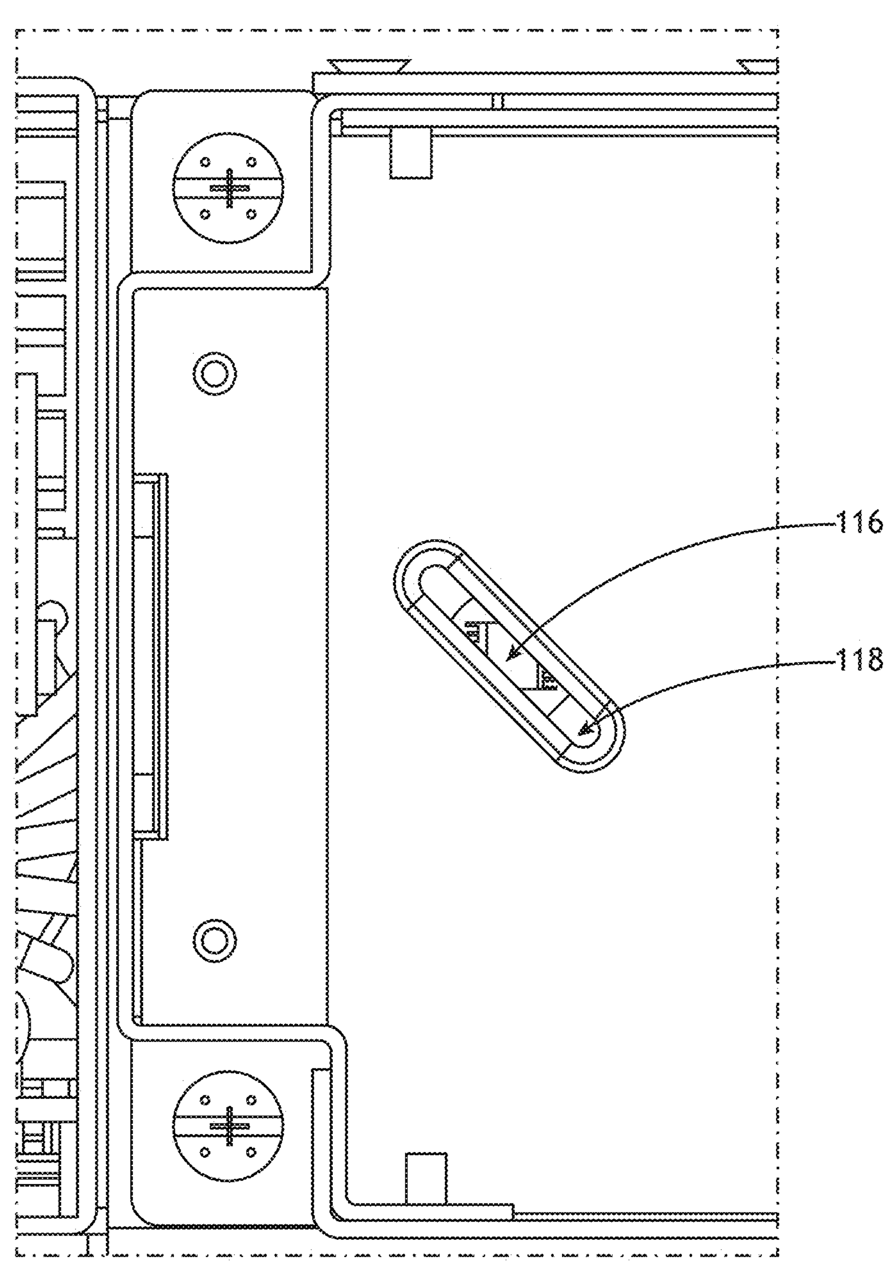
FIG. 2F is a three-dimensional view of a punched casing of an accessory including a keyed feature fabricated as a formed aperture, in accordance with one or more embodiments of the present disclosure.
Figure 2G:
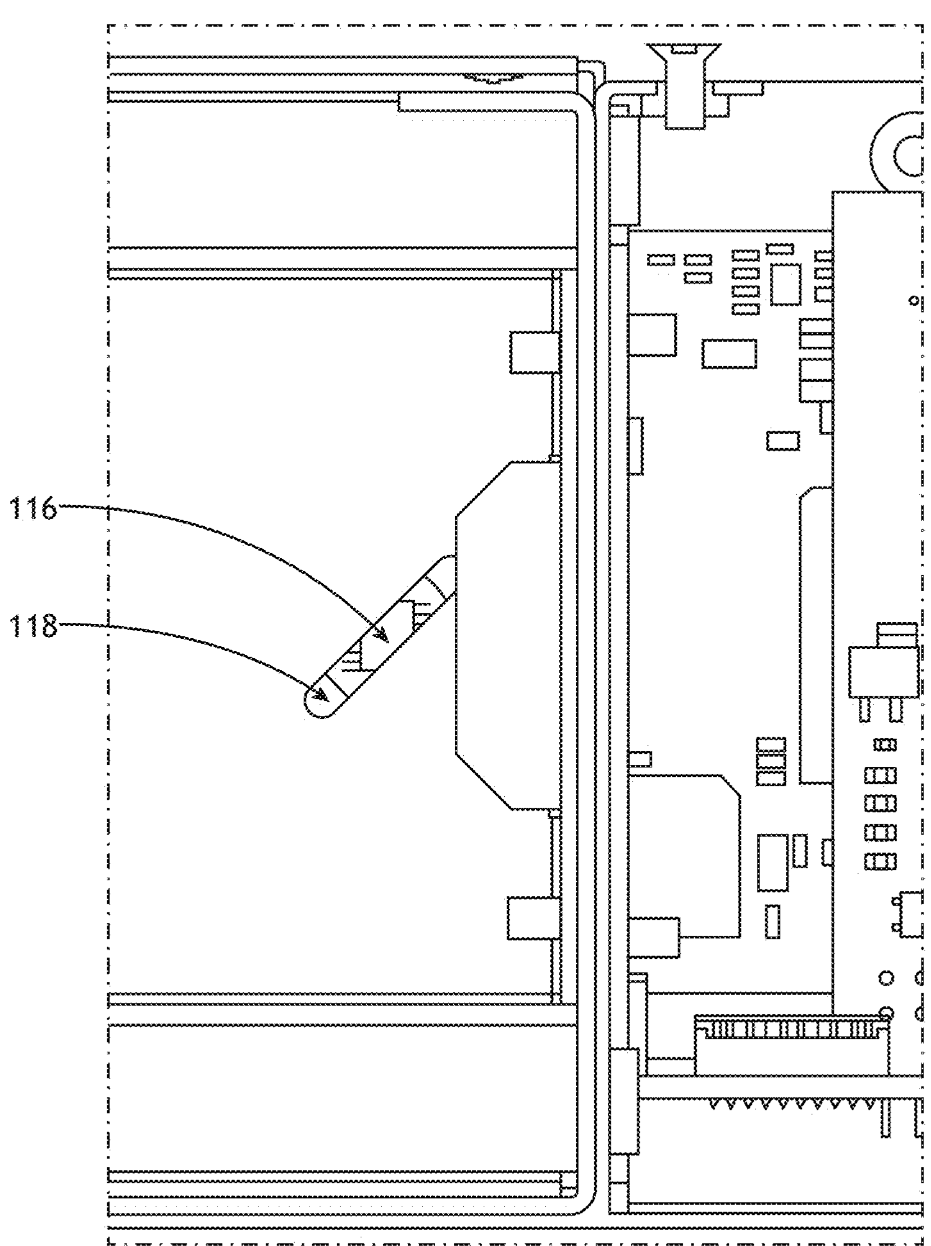
FIG. 2G is a three-dimensional view of a punched casing of an accessory including a keyed feature fabricated as a punched aperture, in accordance with one or more embodiments of the present disclosure.

Further, a keyed feature 118 may be formed from a casing of an accessory 112 using any technique including, but not limited to, extrusion, stamping, or punching. FIG. 2D is a three-dimensional view of a stamped and formed casing 212 of an accessory 112 including a protruding keyed feature 118, in accordance with one or more embodiments of the present disclosure. FIG. 2E is a three-dimensional view of a punched casing 212 of an accessory 112 including a protruding keyed feature 118, in accordance with one or more embodiments of the present disclosure. FIG. 2F is a three-dimensional view of a punched casing 212 of an accessory 112 including a keyed feature 118 fabricated as a formed aperture, in accordance with one or more embodiments of the present disclosure. FIG. 2G is a three-dimensional view of a punched casing 212 of an accessory 112 including a keyed feature 118 fabricated as a punched aperture, in accordance with one or more embodiments of the present disclosure.

A non-contact sensor 116 suitable for angle measurements may have any design suitable for measuring an orientation of the keyed feature 118 (e.g., an orientation of an asymmetric cross-sectional profile of the keyed feature 118).

In some embodiments, the non-contact sensor 116 is a magnetoresistive sensor, which may determine an orientation of a keyed feature 118 based on a proximate magnetic field proximate to the sensor. A magnetoresistive non-contact sensor 116 may be suitable for application in which the keyed feature 118 (and/or a casing of the accessory 112) is formed from a material that perturbs a magnetic field proximate to the magnetoresistive non-contact sensor 116 such as, but not limited to, a metal. For example, a keyed feature 118 with an asymmetrical profile (e.g., an asymmetric protruding element, a slit, an aperture, or the like) may perturb a magnetic field proximate to a magnetoresistive sensor in a manner that may be precisely detected. It is contemplated herein that a magnetoresistive non-contact sensor 116 may provide suitable resolution for orientation detection of a keyed feature 118 while also being relatively low cost and simple to implement. For example, some variations of a magnetoresistive non-contact sensor 116 may be suitable for detecting on the order of tens to hundreds of distinct orientations of a keyed feature 118, which may be sufficient for a number of accessories 112 suitable for coupling with a particular PMD 102. Further, a magnetoresistive non-contact sensor 116 may be readily available as a commercial-off-the-shelf COTS component and may be relatively inexpensive. For example, a magnetoresistive non-contact sensor 116 may be provided as an application-specific integrated circuit (ASIC) on a chip that may simply be placed in an area of the PMD 102 proximate to a keyed feature 118 when an accessory 112 is coupled to the PMD 102.

However, it is to be understood that the systems and methods disclosed herein may include any type of non-contact sensor 116 and keyed feature 118 combination suitable for non-contact identification of an accessory 112 to a PMD 102. As a non-limiting illustration, the non-contact sensor 116 may include a magnetic angle sensor.

Figure 3:
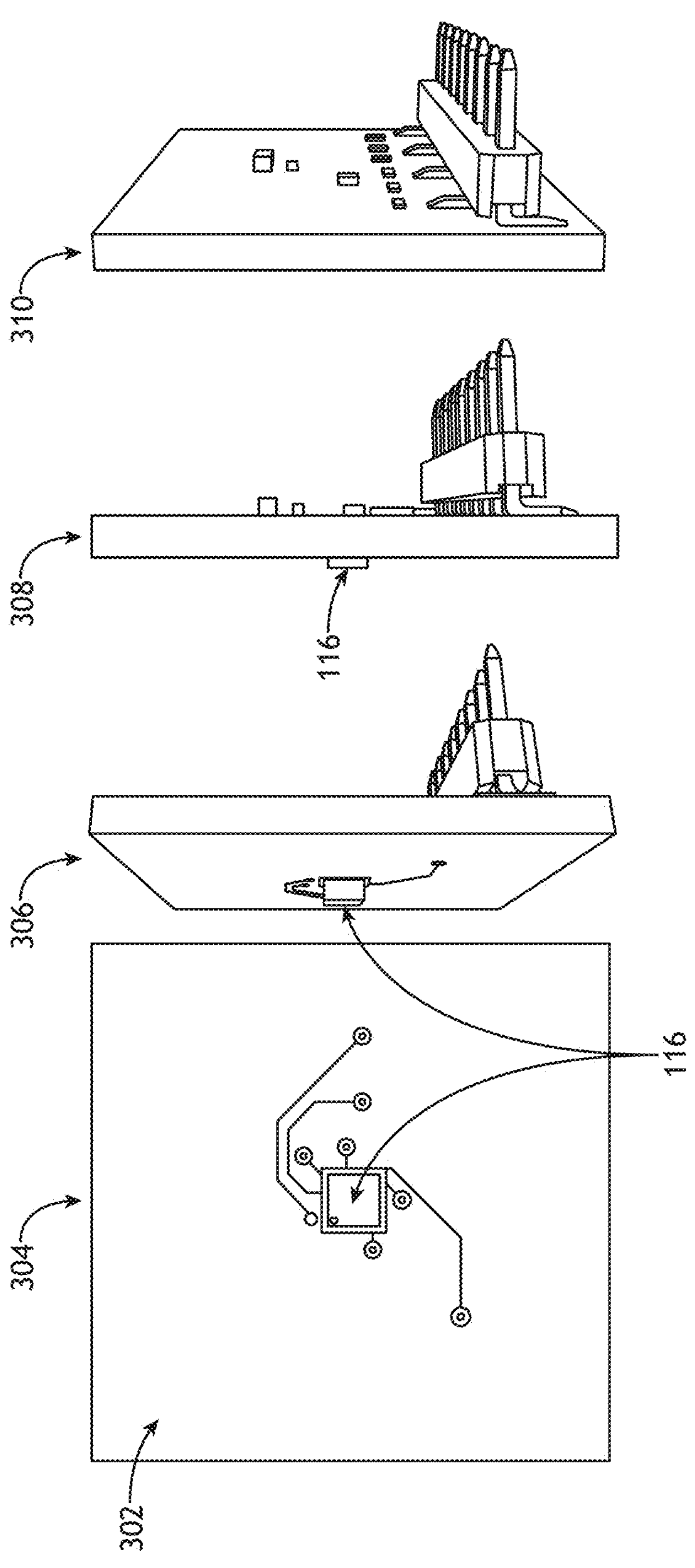
FIG. 3 is a series of views of a magnetoresistive non-contact sensor mounted to a printed circuit board (PCB), in accordance with one or more embodiments of the present disclosure.
Figure 4:
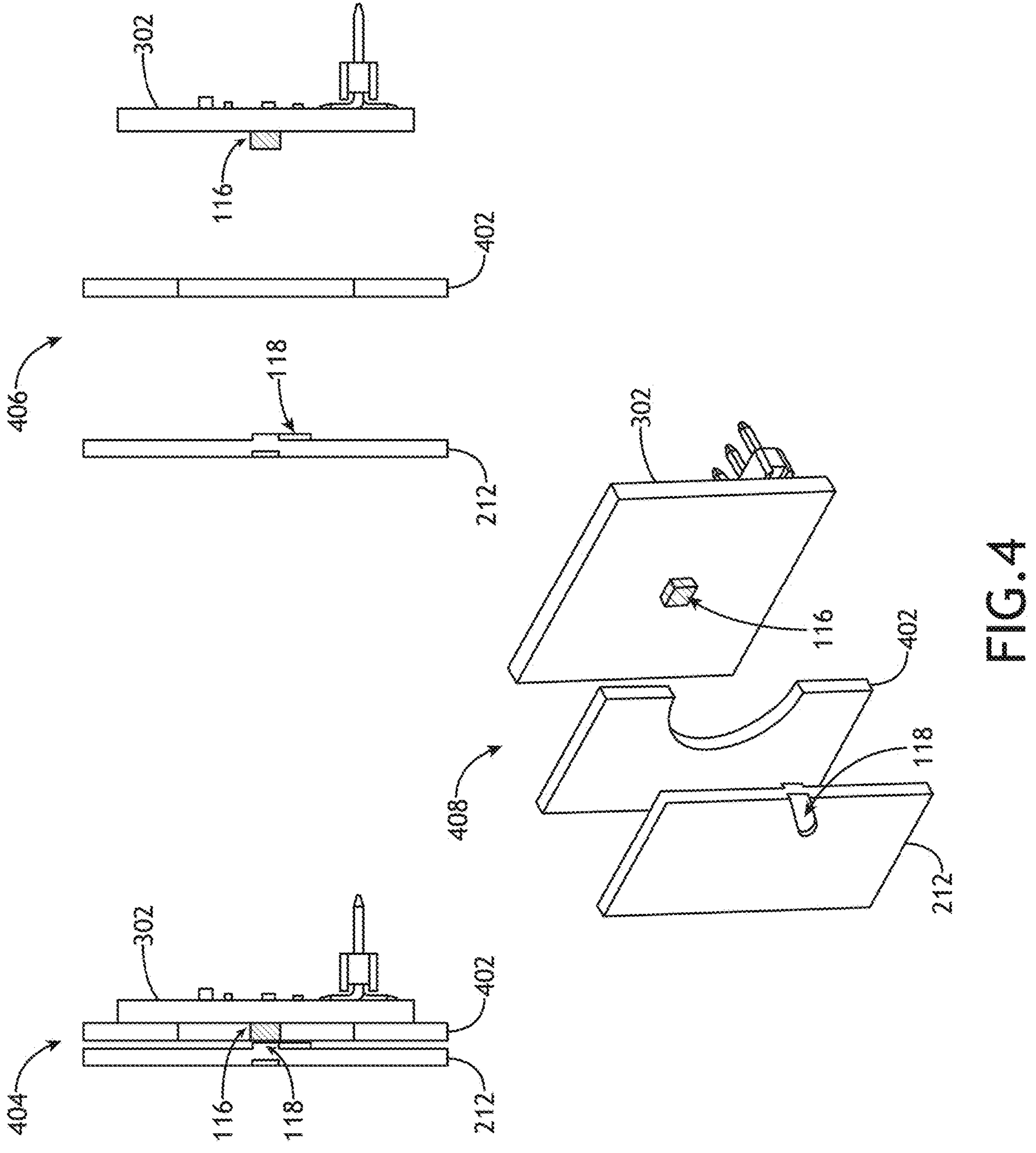
FIG. 4 is a series of views of a PCB along with portions of a casing of a power management device (PMD) and a casing of the accessory to illustrate how a keyed feature may be placed in proximity to a non-contact sensor.

Referring now to FIGS. 3-4, FIGS. 3-4 present various implementations of a magnetoresistive non-contact sensor 116, in accordance with one or more embodiments of the present disclosure.

FIG. 3 is a series of views of a magnetoresistive non-contact sensor 116 mounted to a printed circuit board (PCB) 302, in accordance with one or more embodiments of the present disclosure. Panel 304 is a front view of the PCB 302 showing a top face of the magnetoresistive non-contact sensor 116 depicted as a chip (e.g., an ASIC). Panel 306 is a first perspective view of the PCB 302. Panel 308 is a side view of the PCB 302. Panel 310 is a second perspective view of the PCB 302 showing a back surface.

FIG. 4 is a series of views of a PCB 302 along with portions of a casing 402 of the PMD 102 and a casing 212 of the accessory 112 to illustrate how a keyed feature 118 may be placed in proximity to a non-contact sensor 116. Panel 404 is a side view of the PCB 302 with the non-contact sensor 116, the casing 402 of the PMD 102, and the casing 212 of the accessory 112 with the keyed feature 118 (here, depicted as a protruding feature). Panel 406 is a side exploded view corresponding to panel 404. Panel 408 is a perspective exploded view of panel 404. As illustrated in FIG. 4, the casing 402 of the PMD 102 may include an aperture to expose the non-contact sensor 116 such that it may be in close proximity to (but not in direct contact with) a keyed feature 118 on the accessory 112.

FIGS. 5A-6B depict various non-limiting placement options for the keyed feature 118 and non-contact sensor 116. In a general sense, the keyed feature 118 and the non-contact sensor 116 may be placed in any suitable locations on the accessory 112 and PMD 102, respectively.

Figure 5A:
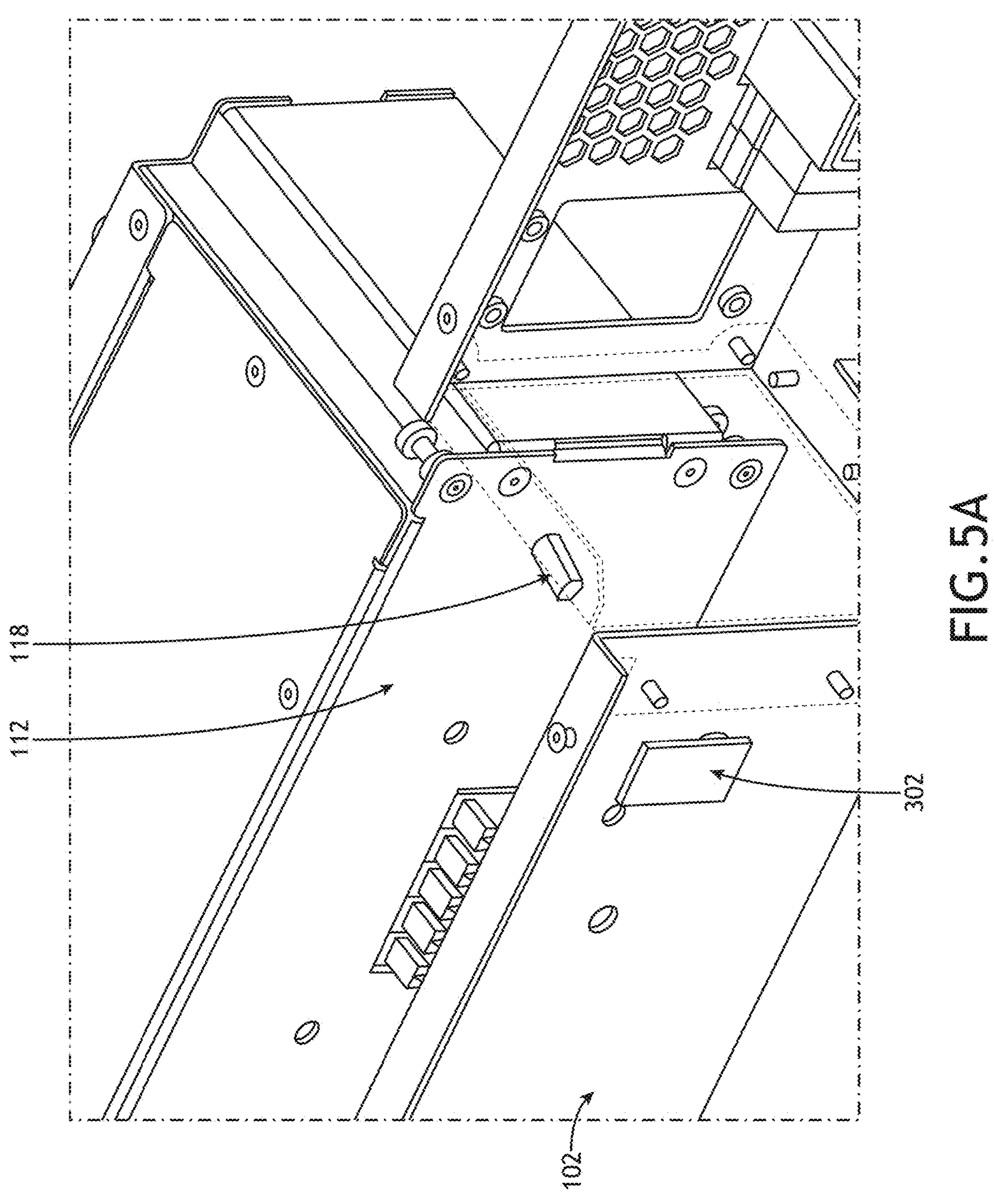
FIG. 5A is a perspective view of an interior portion of a PMD including a rear view of a PCB with a non-contact sensor and an accessory with a protruding keyed feature on a rear portion of the accessory, in accordance with one or more embodiments of the present disclosure.
Figure 5B:
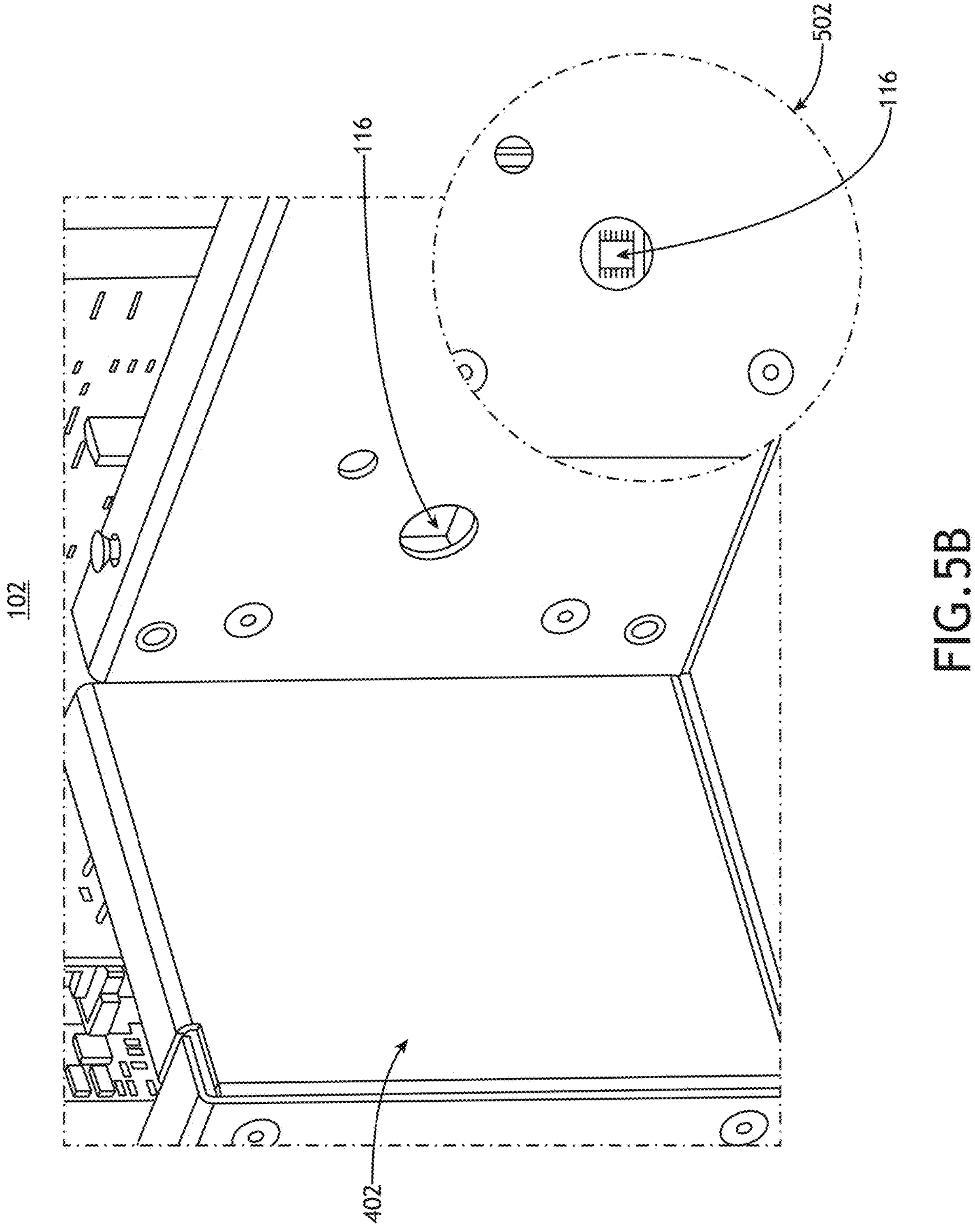
FIG. 5B is a perspective view of an exterior portion of the PMD showing the non-contact sensor through an opening in the casing, in accordance with one or more embodiments of the present disclosure.

FIG. 5A is a perspective view of an interior portion of a PMD 102 including a rear view of a PCB 302 with a non-contact sensor 116 (not shown in this view) and an accessory 112 with a protruding keyed feature 118 on a rear portion of the accessory 112, in accordance with one or more embodiments of the present disclosure. It is noted that FIG. 5A shows a configuration prior to coupling for illustrative clarity. FIG. 5B is a perspective view of an exterior portion of the PMD 102 showing the non-contact sensor 116 through an opening in the casing 402, in accordance with one or more embodiments of the present disclosure. Inset 502 is a front view further illustrating the non-contact sensor 116 through the opening in the casing 402.

Figure 6A:
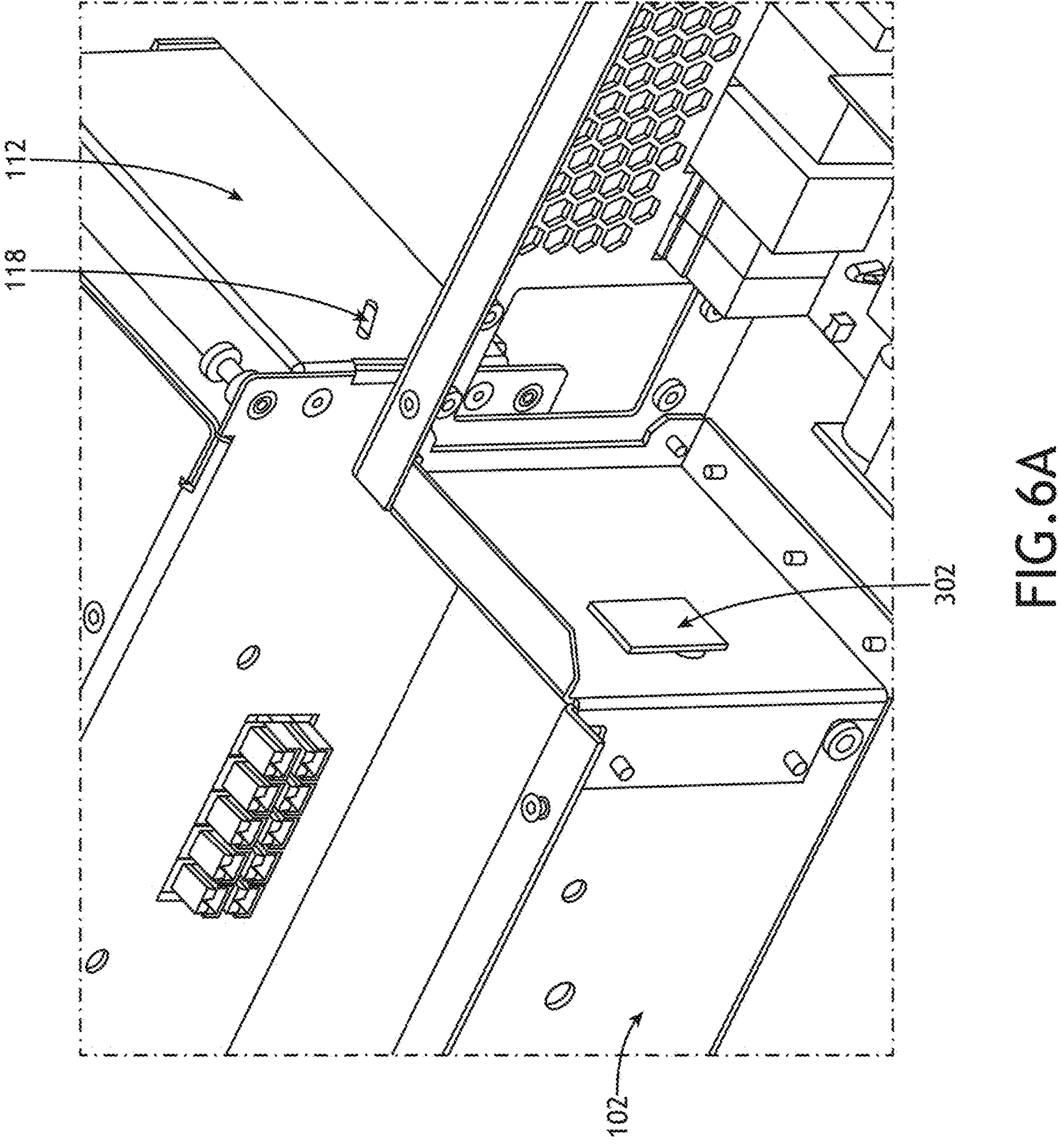
FIG. 6A is a perspective view of an interior portion of a PMD including a rear view of a PCB with a non-contact sensor and an accessory with a protruding keyed feature on a side portion of the accessory, in accordance with one or more embodiments of the present disclosure.
Figure 6B:
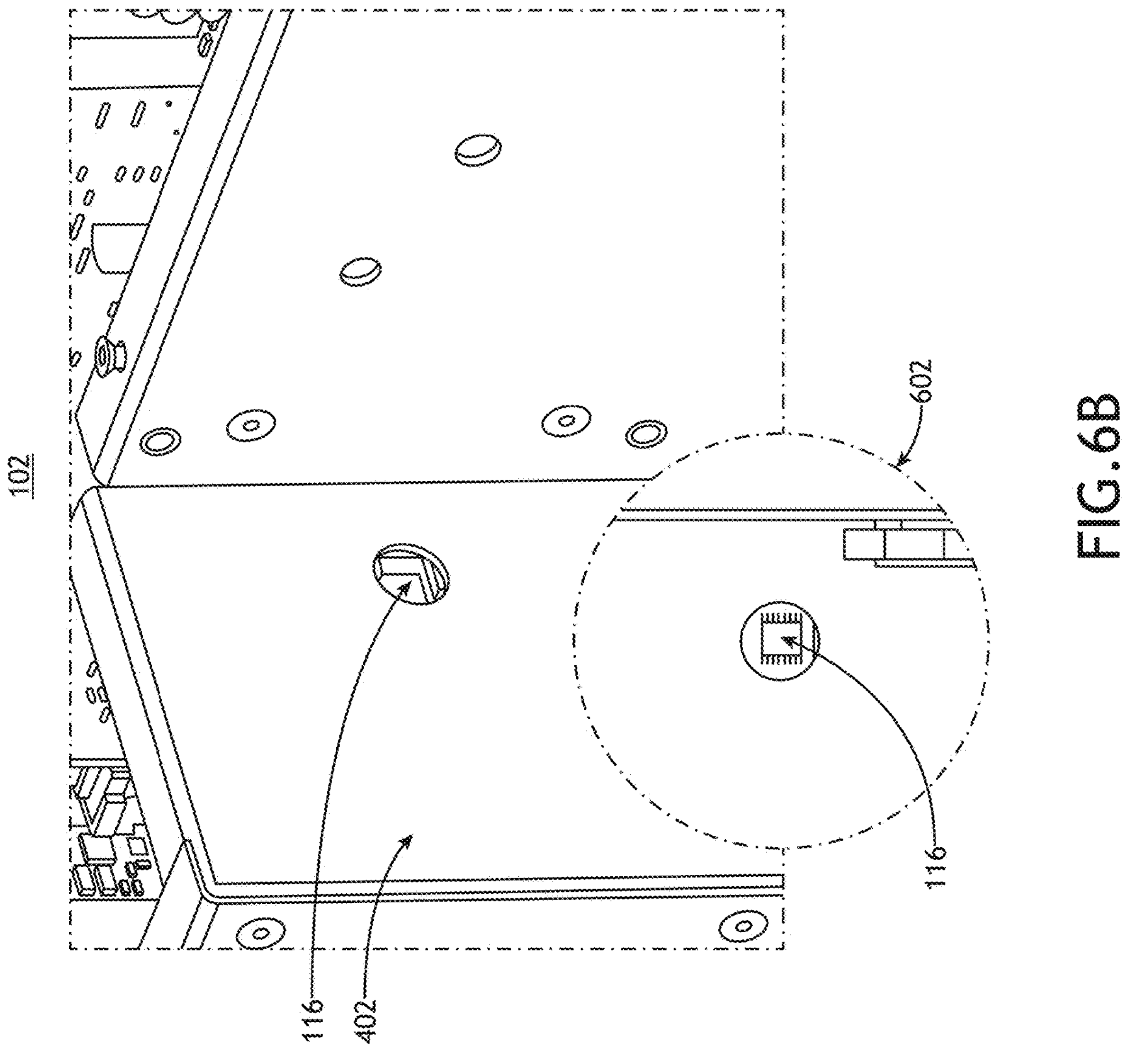
FIG. 6B is a perspective view of an exterior portion of the PMD showing the non-contact sensor through an opening in the casing, in accordance with one or more embodiments of the present disclosure.

FIG. 6A is a perspective view of an interior portion of a PMD 102 including a rear view of a PCB 302 with a non-contact sensor 116 and an accessory 112 with a protruding keyed feature 118 on a side portion of the accessory 112, in accordance with one or more embodiments of the present disclosure. It is noted that FIG. 6A shows a configuration prior to coupling for illustrative clarity. FIG. 6B is a perspective view of an exterior portion of the PMD 102 showing the non-contact sensor 116 through an opening in the casing 402, in accordance with one or more embodiments of the present disclosure. Inset 602 is a front view further illustrating the non-contact sensor 116 through the opening in the casing 402.

Referring again to FIG. 1, in some embodiments, the PMD 102 includes a controller 122, which may include one or more processors 124. For example, the one or more processors 124 may be configured to execute a set of program instructions maintained in a memory 126, or memory device. As an illustration, the controller 122 may be configured to execute program instructions causing the processors 124 to perform any actions. For example, the controller 122 may identify an accessory 112 based on data from the non-contact sensor 116 (e.g., data representative of an orientation of a keyed feature 118). As another example, the controller 122 may adjust one or more parameters of the PMD 102. For example, the controller 122 may adjust at least one of a power, a voltage, or a current of the output power provided to at least one of the one or more loads 110.

The one or more processors 124 of a controller 122 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 124 may include any device configured to execute algorithms and/or instructions (e.g., program instructions stored in memory). In some embodiments, the one or more processors 124 may be embodied as a desktop computer, mainframe computer system, workstation, image computer, parallel processor, networked computer, or any other computer system configured to execute program instructions. Further, the steps described throughout the present disclosure may be carried out by a single controller or, alternatively, multiple controllers. Additionally, the controller 706 may include one or more controllers housed in a common housing or within multiple housings.

The memory 126 may include any storage medium known in the art suitable for storing program instructions executable by the associated one or more processors 124. For example, the memory 126 may include a non-transitory memory medium. By way of another example, the memory 126 may include, but is not limited to, a read-only memory (ROM), a random-access memory (RAM), a magnetic or optical memory device (e.g., disk), a magnetic tape, a solid-state drive and the like. It is further noted that memory 126 may be housed in a common controller housing with the one or more processors 708. In some embodiments, the memory 126 may be located remotely with respect to the physical location of the one or more processors 124 and the controller 122. For instance, the one or more processors 124 of the controller 122 may access a remote memory (e.g., server), accessible through a network (e.g., internet, intranet and the like).

Figure 7:
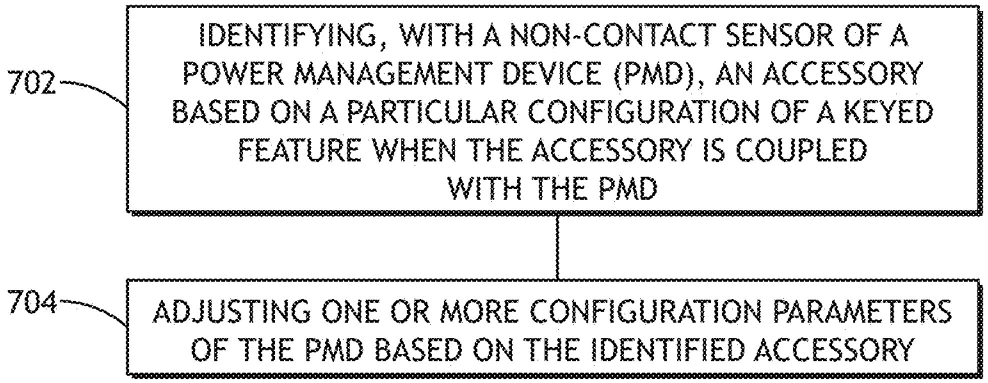
FIG. 7 is a flow diagram illustrating steps performed in a power distribution method, in accordance with one or more embodiments of the present disclosure.

Referring now to FIG. 7, FIG. 7 is a flow diagram illustrating steps performed in a power distribution method 700, in accordance with one or more embodiments of the present disclosure. The embodiments and enabling technologies described previously herein in the context of the power management system 100 should be interpreted to extend to the method 700. For example, the one or more processors 124 of the controller 122 may implement various steps of the method 700 either directly or indirectly by generating control signals to control other components. However, that the method 700 is not limited to the architecture of the power management system 100.

The method 700 may include a step 702 of identifying, with a non-contact sensor 116 of a PMD 102, an accessory 112 based on a particular configuration of a keyed feature 118 when the accessory 112 is coupled with the PMD 102. The PMD 102 may include any device suitable for receiving input power 106 from an external source and distributing output power 108 to one or more loads 110 such as, but not limited to a battery, a rectifier, an AC to DC converter, or a DC to AC converter. Further, the accessory 112 may include any component connectable with the PMD 102 such as, but not limited to, an I/O component, a PDU, or a POD.

As an illustration, the step 702 may include identifying a particular angle of a component of the keyed feature 118 from a plurality of possible angular orientations of the component. In this configuration, the step 702 may be implemented by an angle sensor such as, but not limited to, a magentoresistive angle sensor.

The method 700 may include a step 704 of adjusting one or more configuration parameters of the PMD 102 based on the identified accessory 112. For example, the step 704 may include adjusting at least one of a power, a voltage, or a current of the output power provided to the one or more loads 110 connected to the PMD 102 based on the identified accessory 112.

Referring generally to FIGS. 1-6B, it is to be understood that the FIGS. 1-6B are provided solely for illustrative purposes, but should not be interpreted as limiting. For example, FIGS. 1-6B present examples for non-contact identification power management devices. However, the systems and methods disclosed herein may be extended to non-contact identification of any type of accessory. As another non-limiting illustration, the systems and methods disclosed herein may be extended to non-contact identification of accessories for construction machinery.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A power management device comprising:

a power management device comprising:

one or more electrical components including at least one of a battery, a rectifier, an alternating current (AC) to direct current (DC) converter, or a DC to AC converter, wherein the one or more electrical components are configured to receive input power and provide output power to one or more loads;

a non-contact angle sensor suitable for distinguishing between a plurality of angles of a component of a keyed feature; and a controller configured to:

identify an accessory including a particular configuration of the keyed feature based on data from the non-contact sensor when the accessory is coupled with the power management device; and adjust one or more configuration parameters of the power management device based on the identified accessory.

2. The power management device of claim 1, wherein the keyed feature comprises:

a protruding feature extending from a casing of the accessory, wherein the plurality of angles of the component of the keyed feature correspond to angles of a face of the protruding feature.

3. The power management device of claim 1, wherein the keyed feature comprises:

a slit in a casing of the accessory, wherein the plurality of angles of the component of the keyed feature correspond to angles of the slit.

4. The power management device of claim 1, wherein adjust the one or more configuration parameters of the power management device based on the identified accessory comprises:

adjust at least one of a power, a voltage, or a current of the output power provided to at least one of the one or more loads.

5. The power management device of claim 1, wherein the power management device comprises:

an uninterruptible power supply (UPS).

6. The power management device of claim 1, wherein the power management device comprises:

a power distribution unit (PDU).

7. The power management device of claim 1, wherein the power management device comprises:

a DC power system.

8. The power management device of claim 1, wherein the accessory comprises:

an input/output (I/O) component.

9. The power management device of claim 1, wherein the accessory comprises:

a power distribution unit (PDU).

10. The power management device of claim 1, wherein the accessory comprises:

a power output distribution unit (POD).

11. A method comprising:

identifying, with a non-contact angle sensor of a power management device suitable for distinguishing between a plurality of angles of a component of a keyed feature, an accessory based on a particular angle of a keyed feature when the accessory is coupled with the power management device, wherein the power management device comprises one or more electrical components including at least one of a battery, a rectifier, an alternating current (AC) to direct current (DC) converter, or a DC to AC converter, wherein the one or more electrical components are configured to receive input power and provide output power to one or more loads; and adjusting one or more configuration parameters of the power management device based on the identified accessory.

12. The method of claim 11, wherein identifying, with the non-contact sensor of the power management device, the accessory based on the particular configuration of the keyed feature when the accessory is coupled with the power management device comprises:

Identifying the particular angle of the component of the keyed feature from a plurality of possible angular orientations of the component.

13. The method of claim 12, wherein the keyed feature comprises:

a protruding feature extending from a casing of the accessory, wherein the plurality of possible angular orientations of the component of the keyed feature correspond to angles of a face of the protruding feature.

14. The method of claim 12, wherein the keyed feature comprises:

a slit in a casing of the accessory, wherein the plurality of possible angular orientations of the component of the keyed feature correspond to angles of the slit.

15. The method of claim 11, wherein adjusting the one or more configuration parameters of the power management device based on the identified accessory comprises:

adjust at least one of a power, a voltage, or a current of the output power provided to the one or more loads connected to the power management device.

16. The method of claim 11, wherein the power management device comprises:

at least one of an uninterruptible power supply (UPS), a power distribution unit (PDU), or a DC power system.

17. The method of claim 11, wherein the accessory comprises:

at least one of an input/output (I/O) component, a power distribution unit (PDU), or a power output distribution unit (POD).

18. A power management system comprising:

an accessory including a particular configuration of a keyed feature; and a power management device comprising:

one or more electrical components including at least one of a battery, a rectifier, an alternating current (AC) to direct current (DC) converter, or a DC to AC converter, wherein the one or more electrical components are configured to receive input power and provide output power to one or more loads;

a non-contact angle sensor suitable for distinguishing between a plurality of angles of a component of the keyed feature; and a controller configured to:

identify the accessory based on data from the non-contact sensor when the accessory is coupled with the power management device; and adjust one or more configuration parameters of the power management device based on the identified accessory.

* * * * *